Sept. 15, 1925.
P. HÖSEL
THREE-UNIT SET
Filed Jan. 24, 1925
1,554,093
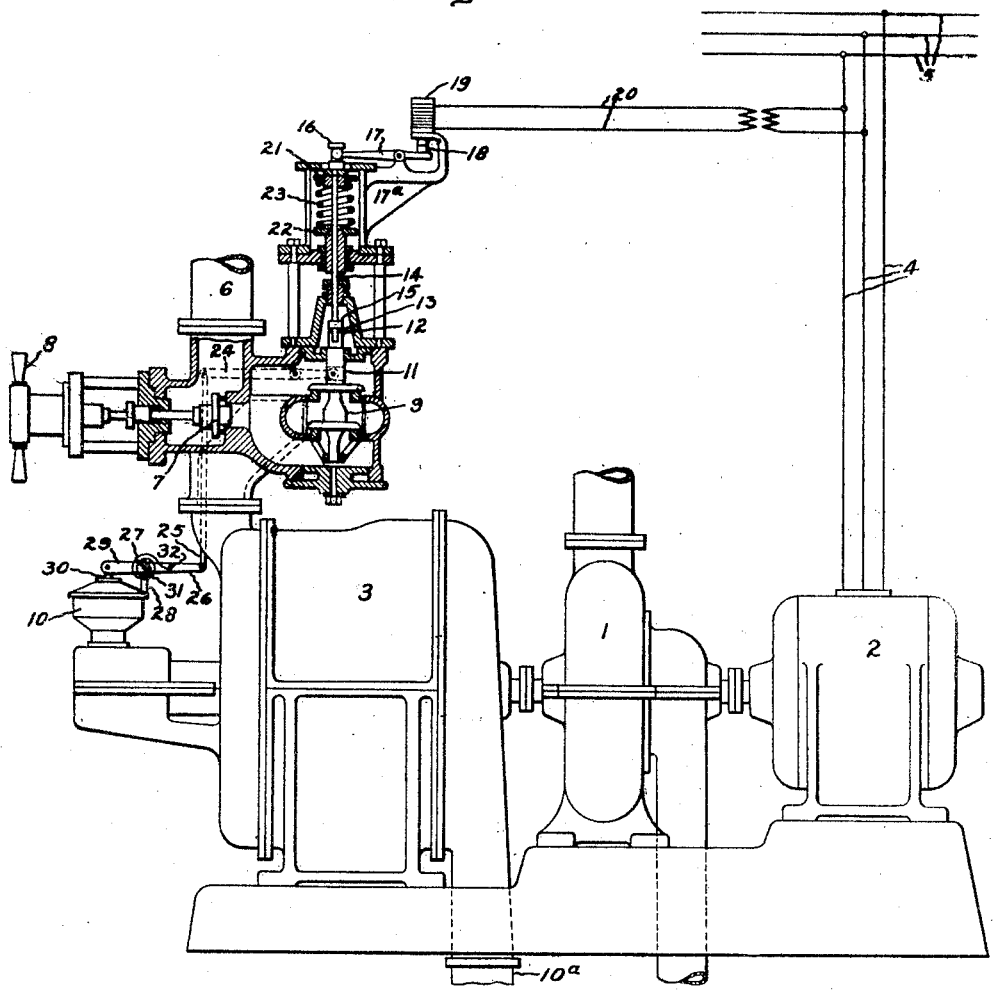
Fig. 1.
Fig. 2.
Fig. 3.
Inventor:
Paul Hösel,
by 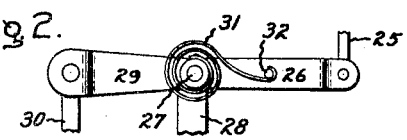
His Attorney.

Patented Sept. 15, 1925.

1,554,093

UNITED STATES PATENT OFFICE.

PAUL HÖSEL, OF CHARLOTTENBURG, GERMANY, ASSIGNOR TO ALLGEMEINE ELEKTRICITÄTS GESELLSCHAFT, OF BERLIN, GERMANY.

THREE-UNIT SET.

Application filed January 24, 1925. Serial No. 4,566.

*To all whom it may concern:*

Be it known that I, PAUL HÖSEL, a citizen of Germany, residing at Charlottenburg, Germany, have invented certain new and useful Improvements in Three-Unit Sets, of which the following is a specification.

The present invention relates to what are now usually termed three-unit sets, that is, sets comprising a turbine, a motor and a driven machine all connected rigidly on a common shaft. Such sets are used for driving auxiliaries in power stations. As ordinarily operated, the motor, usually an alternating current motor, is connected to the main bus bars of the station so that its speed is set by the speed of the main generator and the governor of the turbine is set for a speed lower than the normal motor speed. With this arrangement under ordinary operating conditions, the motor drives the driven machine and also the rotor of the turbine, the governor of the turbine being set so that at this speed it holds closed the regulating valve for the turbine. In case the supply of power to the motor fails, however, then as soon as the speed drops somewhat, the governor for the turbine opens the turbine regulating valve putting the turbine into operation to drive the driven machine. When power to the motor is restored, then it will speed up and again take the load, the turbine regulating valve being closed by the turbine governor. The set will thus shift from motor drive to turbine drive and back again automatically. Sets of this type are now well known in connection with power station auxiliaries.

When a set of this type is used to drive a pump, such as one of the water pumps for the condenser, the difficulty is experienced that the speed of the pump is higher when it is being driven by the motor than when it is being driven by the turbine. This has the disadvantage that if the pump is arranged for the turbine drive speed then when driven by the motor the requirement for power is essentially greater. On the other hand, if the pump is designed for the motor drive speed then with turbine drive, due to the lower speed, the efficiency of the pump is reduced and there is danger that the pump pressure may not be sufficient for operation under full load station conditions.

The object of the present invention is to provide an arrangement for remedying the above difficulty and to this end there is provided means whereby the driven machine of a three-unit set will be operated at the same speed whether being driven by the motor or the turbine. By this means, therefore, the speed of the driven machine will be the same whether being driven by the motor or by the turbine.

For a consideration of what I believe to be novel and my invention, attention is directed to the accompanying description and the claims appended thereto.

In the drawing, Fig. 1 is a view illustrating a system embodying my invention, and Figs. 2 and 3 are detail views in side elevation and plan respectively of the governor lever connections.

Referring to the drawing, 1 indicates a pump which is direct connected to a motor 2 and a turbine 3, whereby there is provided a three-unit set. Motor 2 is connected by lead wires 4 to bus bars 5 from which it takes power for operation. Connected to turbine 3 is an elastic fluid admission conduit 6 which may take elastic fluid from any suitable source, such as one of the boilers of a power house for example. In conduit 6 is a manually controlled shut-off valve 7 adapted to be opened and closed by a hand wheel 8, and also a regulating valve 9 which is connected to a speed governor 10 and serves to regulate the admission of elastic fluid to the turbine in accordance with the speed of the turbine. The exhaust conduit of the turbine is indicated at 10$^a$.

Valve 9 is provided with a stem 11 which projects out through the valve casing and is provided at its upper end with a socket 12 in which is located the lower end 13 of a rod 14. On rod 14 is a stop 15 for limiting the downward movement of the rod. The upper end of rod 14 terminates in a head 16 to which is connected one end of a lever 17 fulcrumed on a bracket arm 17$^a$. On the other end of lever 17 is an armature 18 arranged in operative relation to an electromagnet 19 which is connected by lead wires 20 to the lead wires 4 which connect motor 2 to bus bars 5. Electromagnet 19 is thus energized by current from the same source as that which supplies current to operate motor 2. On rod 14 beneath head 16 is a spring plug 21 and arranged between this spring plug and a stationary spring plug 22 is a compression spring 23. Spring 23 acts in an upward direction so that it tends to move rod 14 upward. When rod 14 moves upward, armature 18 is moved away from electromagnet 19 and at the same time stop 15 on rod 14 is moved away from the upper end of stem 11, the loose end 13 of rod 14 sliding in socket 12.

Stem 11 is connected by a lever 24 to the upper end of a link 25. The lower end of link 25 is connected to one end of an arm 26 loosely mounted on a shaft 27 carried by a post 28 mounted on the governor casing. Mounted on shaft 27 is a second arm 29 the outer end of which is connected directly to the governor spindle 30. Arms 29 and 26 are connected together by means of a spring 31, a coiled spring having one end connected to the hub of arm 29 and the other end connected to a pin 32 fastened to arm 26 being illustrated in the present instance. Spring 31 is of a strength that when the turbine is driving pump 1, it will transmit movement from the governor to valve 9. It will, however, yield to permit arm 26 to move independently of arm 29 and governor 10 under certain conditions.

The operation is as follows:—Under normal conditions, motor 2 receives electrical energy from bus bars 5 to drive pump 1. Under these circumstances, electromagnet 19 is energized and draws armature 18 upward thereby forcing rod 14 downward against the action of spring 23 to hold valve 9 closed, arm 26 being moved against the action of spring 31 to a position corresponding to the closed position of valve 9. Speed governor 10 stands in a position corresponding approximately to the speed at which the set is running, being permitted to assume this position by reason of the yielding of spring 31. The speed governor 10 is adjusted to operate the set at the same speed as that at which it operates when driven by motor 2.

If now the source of electrical energy to motor 2 is interrupted for any reason, then electromagnet 19 is immediately deenergized with the result that spring 23 lifts rod 14 moving stop 15 away from the upper end of valve stem 11. Spring 31 then serves immediately to open valve 9 to an extent corresponding to the position of governor 10. Governor 10 then assumes control of valve 9 to regulate the admission of elastic fluid to the turbine in the usual manner so as to maintain the speed of the set at that for which the governor is set, which, as already stated, is the same speed as that at which the set operates when driven by motor 2.

By this means, therefore, it will be seen that pump 1 is driven at the same speed whether operated by motor 2 or by turbine 3.

When electrical energy is again supplied to motor 2, electromagnet 19 will be reenergized, whereby it will raise armature 18 and force valve 9 to closed position. Motor 2 will thus automatically again take up the load. During normal operation the hand valve 7 is of course in open position as shown in the drawing.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with a three-unit set comprising a turbine, an electric motor, and a driven machine, said turbine having a governor for controlling the supply of elastic fluid to it, of means controlled by the flow of electric current to the motor for shutting off the supply of elastic fluid to the turbine.

2. A three-unit set comprising a turbine, an electric motor, and a driven machine, said turbine having a governor for controlling the supply of elastic fluid to it, characterized by the fact that the governor is adjusted for a speed the same as that at which the motor operates the set and that means responsive to the flow of electric current to the motor is provided for normally shutting off the supply of elastic fluid to the turbine.

3. The combination with a three-unit set comprising a turbine, an electric motor, and a driven machine, said turbine having a regulating valve and a governor for controlling it, of means for maintaining the regulating valve closed to the exclusion of the speed governor when the motor is driving the set whereby the governor may be adjusted for a speed the same as that at which the motor operates the set.

4. The combination with a three-unit set comprising a turbine, an electric motor, and a driven machine, said turbine having a regulating valve and a governor for controlling it, of a yielding member interposed in the connections between the governor and the regulating valve, and means actuated when the motor is driving the driven machine for holding the regulating valve closed.

5. The combination with a three-unit set comprising a turbine, an electric motor, and a driven machine, said turbine having a regulating valve and a governor for controlling it, of an electromagnet connected to the motor circuit, and means actuated by the electromagnet for holding the regulating valve closed.

6. The combination with a three-unit set comprising a turbine, an electric motor, and a driven machine, said turbine having a regulating valve and a governor for controlling it, of an electromagnet connected to the motor circuit, means actuated by the electromagnet for holding the regulating valve closed, and a yielding member interposed in the connections between the valve and governor whereby the electromagnet may close the valve without overpowering the governor.

In witness whereof, I have hereunto set my hand this 5th day of January 1925.

PAUL HÖSEL.